US011884282B1

(12) United States Patent
Pronovost

(10) Patent No.: US 11,884,282 B1
(45) Date of Patent: Jan. 30, 2024

(54) MACHINE-LEARNED MODEL VARIANCE COMPENSATION

(71) Applicant: Zoox, Inc., Foster City, CA (US)

(72) Inventor: Ethan Miller Pronovost, San Mateo, CA (US)

(73) Assignee: ZOOX, INC., Foster City, CA (US)

( * ) Notice: Subject to any disclaimer, the term of this patent is extended or adjusted under 35 U.S.C. 154(b) by 259 days.

(21) Appl. No.: 17/393,987

(22) Filed: Aug. 4, 2021

(51) Int. Cl.
| | |
|---|---|
| B60W 50/00 | (2006.01) |
| G06V 10/24 | (2022.01) |
| G06V 20/58 | (2022.01) |
| G06V 20/10 | (2022.01) |
| G06F 18/214 | (2023.01) |
| B60W 60/00 | (2020.01) |

(52) U.S. Cl.
CPC ..... B60W 50/0097 (2013.01); G06F 18/2148 (2023.01); G06V 10/242 (2022.01); G06V 20/182 (2022.01); G06V 20/58 (2022.01); B60W 60/0027 (2020.02); B60W 2050/0031 (2013.01); B60W 2420/42 (2013.01); B60W 2420/52 (2013.01); B60W 2554/4044 (2020.02)

(58) Field of Classification Search
CPC ......... B60W 50/0097; B60W 60/0027; B60W 2050/0031; B60W 2420/42; B60W 2420/52; B60W 2554/4044; G06F 18/2148; G06V 10/242; G06V 20/182; G06V 20/58

See application file for complete search history.

(56) References Cited

U.S. PATENT DOCUMENTS

| 2018/0173971 A1* | 6/2018 | Jia .......................... G06N 3/084 |
| 2019/0050648 A1* | 2/2019 | Stojanovic ............. G06V 20/13 |
| 2021/0150230 A1* | 5/2021 | Smolyanskiy ......... G06V 20/56 |
| 2021/0197813 A1* | 7/2021 | Houston .............. G05D 1/0223 |

* cited by examiner

*Primary Examiner* — Ig T An
(74) *Attorney, Agent, or Firm* — Lee & Hayes P.C.

(57) ABSTRACT

Techniques for increasing performance of machine-learned models while conserving computational resources generally required by ensemble machine-learning methods are described herein. The techniques may include determining multiple views of a scene that is to be input into a machine-learned model. In some examples, a scene data input may be rotated by 90, 180, and 270 degrees to generate four scene inputs (e.g., 0-, 90-, 180-, and 270-degree rotated inputs) that can be passed through the machine-learned model and the results per scene can be aggregated to determine a final prediction/decision. Similarly, scene inputs may be shifted, reflected, translated, and/or the like before being input into the machine-learned model. The predictions may be associated with one or more objects in the environment that are represented in the scenes.

20 Claims, 8 Drawing Sheets

MACHINE-LEARNED MODEL VARIANCE COMPENSATION

BACKGROUND

Machine-learning algorithms can be trained and used in a wide variety of applications to make predictions or decisions based on input data. In certain situations, such as when a more accurate prediction or decision is desired, ensemble methods can be used in which several different base models can be combined to produce one optimal predictive model. However, ensemble methods generally require a greater amount of computational resources as opposed to using a single predictive model.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
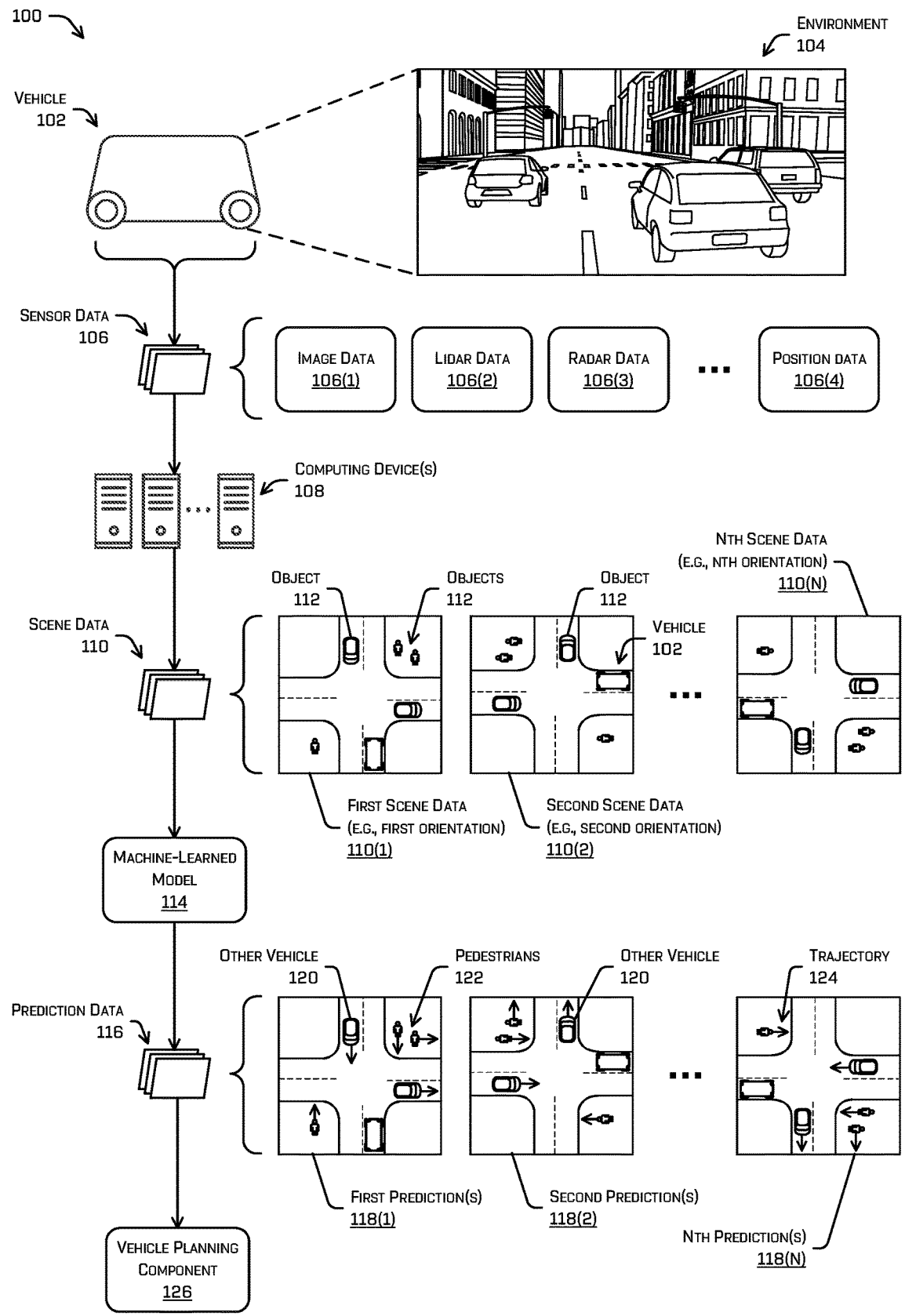
FIG. 1 is a pictorial flow diagram illustrating an example process in which multiple instances of scene data is input into a machine-learned model to determine prediction data that can be used to control a vehicle.

As described above, in some scenarios, ensemble machine-learning methods have been used to combine several different base models to produce one optimal predictive model. However, ensemble methods generally require a greater amount of computational resources as opposed to using a single predictive model. As a result, in situations where computational resources are limited, alternative machine-learning methods that increase the accuracy of predictions and/or decisions may be desired. Take, for instance, a vehicle that utilizes one or more machine-learning algorithms to make predictions and/or decision associated with operating the vehicle. The vehicle itself may have limited computational resources on board due to the size of the vehicle, power constraints, or other constraints. As such, using ensemble machine-learning methods on board a vehicle may not be practicable, as well as other situations in which computational resources may be limited or need to be conserved.

This disclosure is directed to techniques that can be used to increase the performance (e.g., increase the accuracy of predictions, decisions, etc.) of a machine-learned model while conserving the computational resources generally required by ensemble methods. For instance, machine-learned models that use a scene representing an environment as an input can experience a high variance in output predictions from small variances in inputs. For instance, machine-learned model outputs may "flicker" back and forth between predictions based on input variances which, in the context of vehicles, can cause problems such as unnecessary brake tapping, steering adjustments, and the like. For these models (as well as other models), multiple views of a scene may be input into the same model simultaneously. For example, a traditional scene input may be rotated by 90, 180, and 270 degrees, and then the four scenes (e.g., based on the 0-, 90-, 180-, and 270-degree rotations) may be passed through the model and the results per scene can be aggregated to determine a final prediction/decision. In some examples, rotating the input can be advantageous because certain machine-learned models may not be completely rotationally invariant, so flicker may be reduced by aggregating machine-learned model outputs based on different input orientations, which each may produce slightly different outputs. Similarly, scene inputs may be shifted, reflected, translated, and/or the like before being input into the machine-learned model. The predictions may be associated with one or more objects in the environment that are represented in the scenes.

By generating different orientations of scenes and inputting the scenes as part of a batch into a single machine-learned model, the techniques described herein simulate a pseudo ensemble that combines outputs to form a final prediction/decision. However, because the techniques described herein utilize a single machine-learned model, computational resources can be preserved as opposed to using ensemble machine-learning methods. The techniques described herein may be used while training machine-learned models, as well as during inference to make predictions/decisions.

By way of example, and not limitation, a method according to the various techniques described herein may include receiving sensor data associated with a vehicle in an environment. In some examples, the sensor data may include image data, lidar data, radar data, and/or the like. The sensor data may represent one or more objects within the environment that are proximate the vehicle. For instance, the objects may include pedestrians, cyclists, other vehicles, structures, vegetation, traffic signage, and the like. In some examples, the sensor data may be generated by a sensor system of the vehicle while the vehicle operates in the environment to traverse a route between a first (e.g., starting) location and a second (e.g., destination) location.

Based at least in part on the sensor data, the method may include determining first scene data associated with a first orientation of the environment. In some examples, the first orientation may correspond to a first angle of rotation of the first scene data, a first direction of shift of the first scene data, a first translation of the first scene data, a first reflection of the first scene data, and/or the like. In at least one example, the first orientation is an original orientation associated with the first scene data (e.g., not rotated, shifted, translated, reflected, etc.). In some examples, the first scene data may be an image of the environment and/or the vehicle from a top-down (e.g., birds-eye) perspective viewpoint. In one example, the first scene data is a first multi-channel image or a vectorized image representing the environment from a top-down perspective.

In some examples, a batch of scene data may be determined. That is, first scene data, second scene data, third scene data, and so forth may be determined. The number of instances of scene data may correspond with a batch size setting of a machine-learned model that the scene data is to be passed through. As such, the method may include determining, based at least in part on the sensor data or the first scene data, second scene data associated with a second orientation of the environment. In some examples, the second orientation may correspond to a second angle of rotation of the second scene data, a second direction of shift of the second scene data, a second translation of the second scene data, a second reflection of the second scene data, and/or the like. In at least one example, the second orientation is rotated 90, 180, or 270 degrees with respect to the first (e.g., original) scene data. In some examples, the second scene data may be an image of the environment and/or the vehicle from the top-down perspective viewpoint. In one example, the second scene data is a second multi-channel image or vectorized image representing the environment from the top-down perspective.

Additionally, the method may include determining third, fourth, fifth, and so forth scene data based on the batch size setting of the machine-learned model. Each different scene data instance may be associated with a different orientation. In some examples, each instance of scene data may be rotated a threshold amount relative to each other. For instance, in at least one example, the batch of scene data includes first scene data that is original (e.g., 0-degree rotation), second scene data that is rotated 90-degrees relative to the first scene data, third scene data that is rotated 90-degrees relative to the second scene data and/or 180-degrees relative to the first scene data, and fourth scene data that is rotated 90-degress relative to the third scene data and/or 270-degrees relative to the first scene data.

In some examples, the batch of scene data may be input into the machine-learned model. The machine-learned model may be configured to determine, for each instance of scene data included in the batch of scene data, one or more predictions (e.g., intermediate predictions) associated with the one or more objects represented in the scene data. Additionally, in some examples, the machine-learned model may be configured to determine, based on the predictions for each of the instances of scene data, one or more final predictions associated with the one or more objects. The final predictions may be based on a mean, median, mode, aggregation, combination, or the like of the intermediate predictions. In some examples, a prediction associated with an object may include a predicted classification of an object (e.g., whether the object is a vehicle (including type of vehicle), pedestrian, cyclist, structure, etc.), a predicted trajectory of an object, a position of an object, an orientation of an object, and/or the like.

In some examples, the method may include receiving, from the machine-learned model, the predictions (e.g., intermediate predictions) based on the different scene data inputs of the batch. For instance, a first prediction associated with an object in the environment may be received based on the first scene data, a second prediction associated with the object in the environment may be received based on the second scene data, and so forth. Additionally, or alternatively, the output received from the machine-learned model may be the final predictions associated with the objects.

In some examples, a final (e.g., aggregated) prediction/output associated with the object may be determined based at least in part on a combination of the first prediction, the second prediction, and so forth (e.g., the intermediate predictions). For instance, instead of the machine-learned model determining the final prediction, a computing device associated with the vehicle may determine the final prediction. The final prediction may be determined, for example, based at least in part on a combination, average (including weighted average), median, mode, or the like of the first prediction, second prediction, and so forth. In some examples, a final output may be determined based on different output images by rotating, shifting, etc. the outputs so that they all align, and then the outputs may be aggregated. Additionally, or alternatively, the final output may be determined by averaging feature vectors for each object/agent associated with the various outputs.

Based at least in part on the final prediction(s), the vehicle may be controlled. For instance, a trajectory of the vehicle may be determined, altered, recalculated, etc. based at least in part on the final prediction(s) associated with the one or more objects. Additionally, or alternatively, an emitter of the vehicle may be controlled to communicate with an object (e.g., signal to another vehicle or a pedestrian, output an audio message to a pedestrian, and the like).

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using data of the types described herein. Additionally, the techniques described herein can be used with real data (e.g., captured using sensor(s)), simulated data (e.g., generated by a simulator), or any combination of the two.

FIG. 1 is a pictorial flow diagram illustrating an example process 100 in which multiple instances of scene data is input into a machine-learned model to determine prediction data that can be used to control a vehicle. For instance, as the vehicle 102 traverses the environment 104, a sensor system of the vehicle 102 may generate sensor data 106 associated with the environment 104. The sensor data 106 may include, for instance, image data 106(1), lidar data 106(2), radar data 106(3), position data 106(4) (e.g., GPS data, map data, etc.), and the like.

The sensor data 106 may be received by one or more computing devices 108 associated with the vehicle 102. In some examples, the computing devices 108 may be on board the vehicle. Additionally, or alternatively, the computing devices 108 may be located remotely from the vehicle 102. The computing devices 108 may use the sensor data 106 (including some or all of the image data 106(1), lidar data 106(2), radar data 106(3), and position data 106(4)) to generate or otherwise determine scene data 110. The scene data 110, in some examples, may include "images" representing the environment 104 from a top-down perspective, as shown in FIG. 1 (e.g., data formats which compile data into multiple channels of two-dimensional arrays that may be sized and shaped similar to traditional images). In such an examples, the scene data 110 can also be referred to as top-down data 110. In some examples, the scene data 110 may be a batch of scene data that includes first scene data 110(1), second scene data 110(2), and Nth scene data 110(N) (where N represents any number greater than or equal to two). The scene data 110 may represent one or more objects 112 that are in the environment proximate the vehicle 102, such as vehicle objects, pedestrian objects, and/or the like.

As shown in FIG. 1, the first scene data 110(1) is associated with a first orientation, the second scene data 110(2) is associated with a second orientation, and the Nth scene data 110(N) is associated with an Nth orientation. The second orientation of the second scene data 110(2) is shown as being rotated 90 degrees, or substantially perpendicular, counterclockwise to that of the first orientation of the first scene data 110(1). Additionally, the Nth orientation of the Nth scene data 110(N) is shown as being rotated 270 degrees, or substantially perpendicular, counterclockwise to that of the first orientation of the first scene data 110(1).

The computing devices 108 may further input the scene data 110 into a machine-learned model 114. The machine-learned model 114 may be trained to output prediction data 116 based on the scene data 110 inputs. In some examples, a batch size setting associated with the machine-learned model 114 may be equal to the variable N as described above with reference to the scene data 110(1)-110(N). For each instance of scene data 110, the machine-learned model 114 may output one or more corresponding predictions. For instance, the machine-learned model 114 may output one or more first predictions 118(1) associated with the objects based on the first scene data 110(1), one or more second predictions 118(2) associated with the objects based on the second scene data 110(2), and one or more Nth predictions 118(N) based on the Nth scene data 110(N). The predictions may indicate predicted classifications of objects 112, such as whether an object is another vehicle 120, a pedestrian 122, or the like, as well as predicted trajectories 124 associated with the objects 112, predicted locations of the objects 112, and the like. In some examples, the machine-learned model 114 or the computing devices 108 may determine one or more final predictions based on a mean, median, mode, aggregation, and/or the like of the individual predictions for each object included in the predictions 118(1)-118(N).

In some examples, a planning component 126 associated with the vehicle 102 may receive the prediction data 116 (either the individual predictions 118(1)-118(N) or the final predictions as may be determined from some combination of individual predictions) and control the vehicle 102 based at least in part on the prediction data. For instance, the planning component 126 may determine one or more driving instructions for the vehicle 102 to traverse the environment 104 based at least in part on the prediction data 116. The driving instructions may include one or more trajectories for the vehicle 102 to follow in the environment 104.

Figure 2:
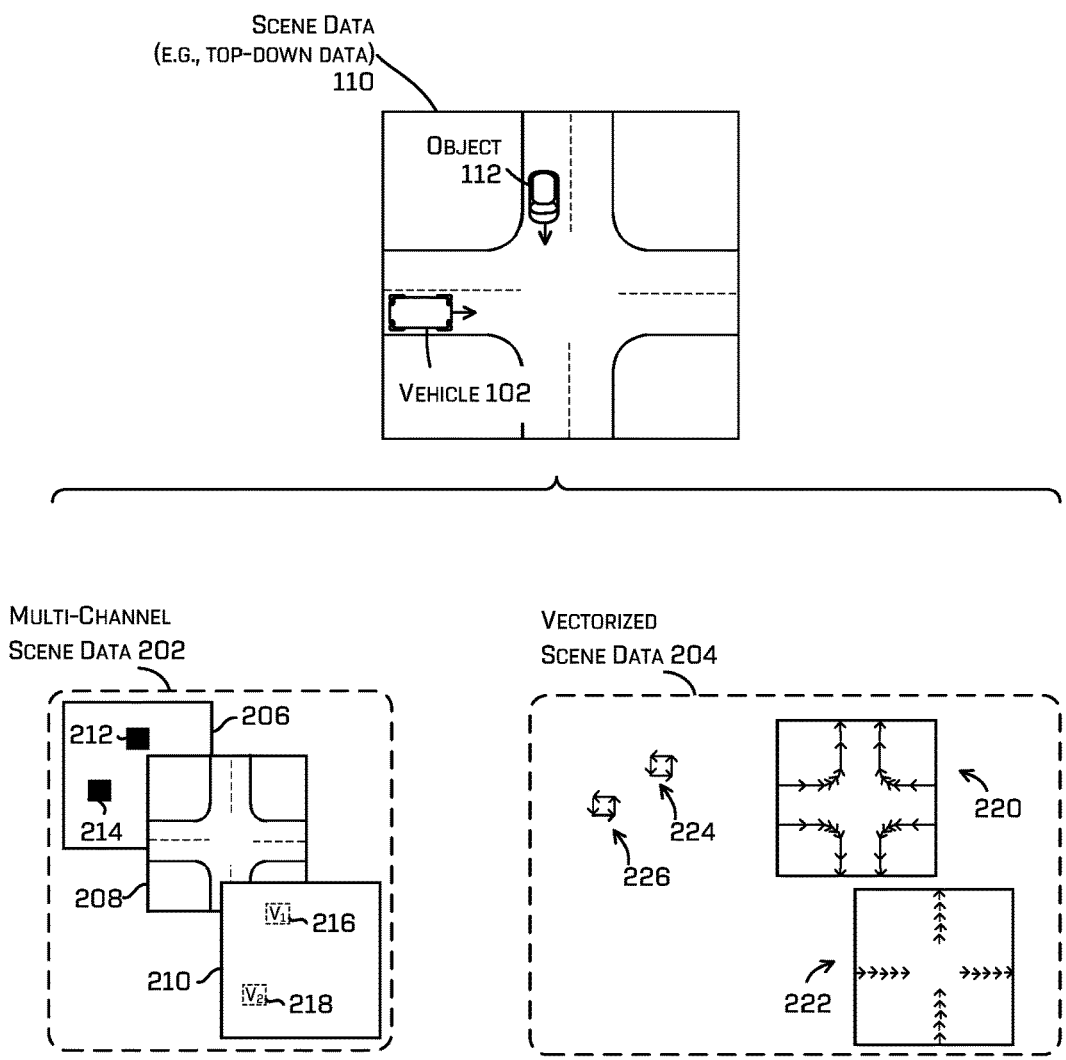
FIG. 2 is a schematic diagram illustrating an example implementation to generate top-down scene data based on multi-channel data and vectorized data, in accordance with examples of the disclosure.

FIG. 2 is a schematic diagram illustrating an example implementation 200 to generate top-down scene data 110 based on multi-channel data and/or vectorized data, in accordance with examples of the disclosure. As illustrated in FIG. 2, top-down scene data 110 discussed above with respect to FIG. 1, may be generated or otherwise determined by the one or more computing devices 108 using one or both of multi-channel scene data 202 and/or vectorized scene data 204.

In some examples, multi-channel scene data 202 represents portions of top-down scene data 110 with different types of information. As shown in FIG. 2, a first channel 206 shows object 112 as a block 212 and shows the vehicle 102 as a block 214. These blocks 212 and 214 correspond to the location of object 112 and the vehicle 102, respectively. A second channel 208 identifies a map that corresponds to the intersection shown in top-down scene data 110. A third channel 210 provides another representation of object 112 (represented as item 216) and the vehicle 102 (represented as item 218).

In some examples, vectorized scene data 204 represents portions of top-down scene data 110 with vector information. As shown in FIG. 2, vectorized scene data 204 includes a first vector portion 220 that corresponds to the intersection shown in top-down scene data 110. A second vector portion 222 corresponds to the lanes in the intersection shown in top-down scene data 110. A third vector portion 224 corresponds to the object 112 shown in top-down scene data 110. A fourth vector portion 226 corresponds to the vehicle 102 shown in top-down scene data 110.

As discussed herein, the one or more computing devices 108 may receive multi-channel scene data 202 and/or vectorized scene data 204. The one or more computing devices may use the received scene data (along with additional random two-dimensional data) to generate the top-down scene data 110. In some examples, top-down scene data 110 may be partially based on multi-channel scene data 202 and/or vectorized scene data 204.

Figure 3:
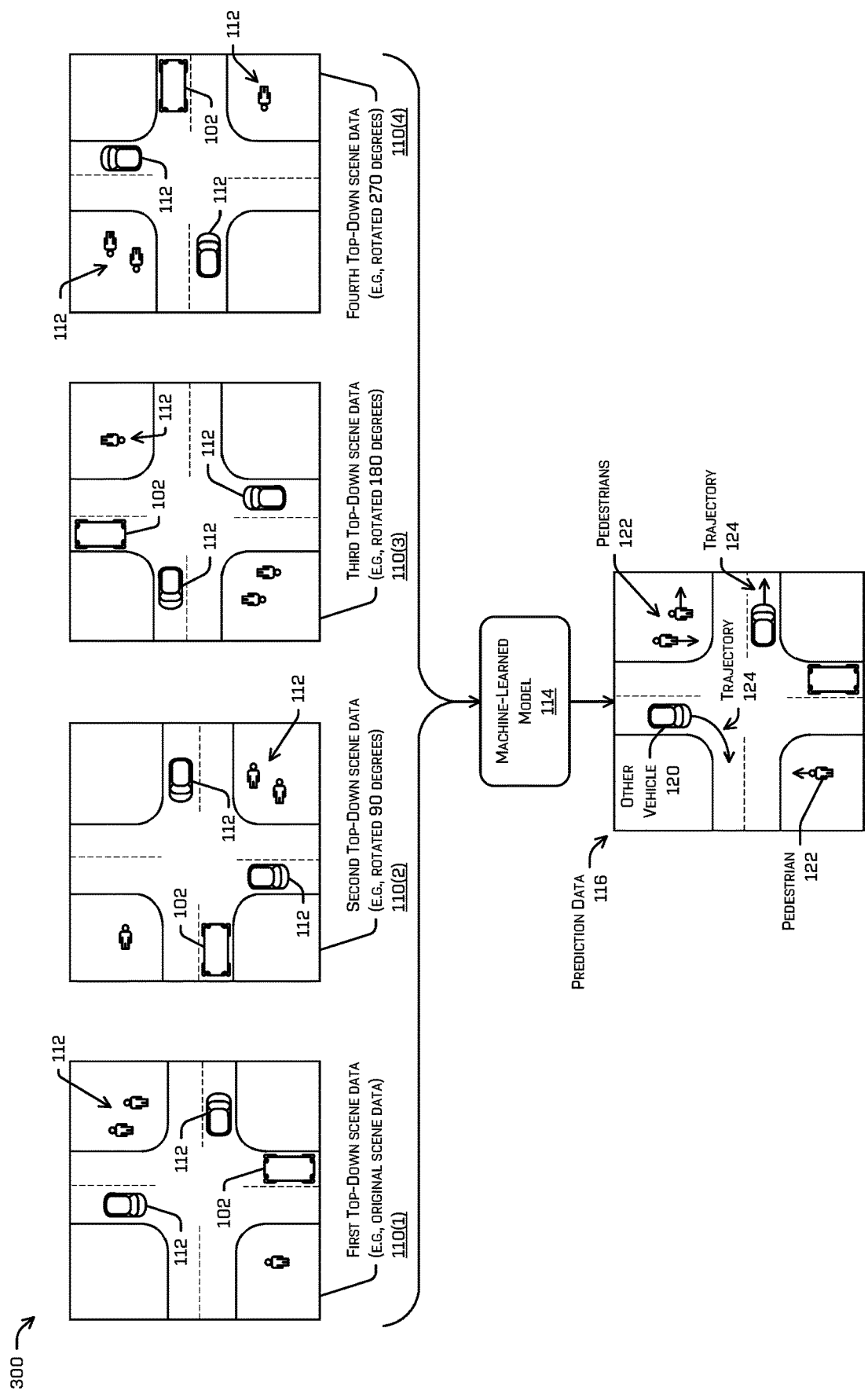
FIG. 3 illustrates an example in which scene data is rotated and the different scene data rotations are input as a batch into a machine-learned model that is configured to determine prediction data.

FIG. 3 illustrates an example 300 in which scene data 110 is rotated and the different scene data rotations 110(1)-110(4) are input as a batch into a machine-learned model 114 that is configured to determine prediction data 116. The scene data 110(1)-110(4) shown in FIG. 3 represents an environment in which the vehicle 102 is operating from a top-down perspective.

The first top-down scene data 110(1) is original scene data. In other words, the first top-down scene data 110(1) has not been rotated, shifted, reflected, or the like. The second top-down scene data 110(2) is rotated 90 degrees clockwise relative to the first top-down scene data 110(1). The third top-down scene data 110(3) is rotated 90 degrees clockwise relative to the second top-down scene data 110(2), and 180 degrees clockwise relative to the first top-down scene data 110(1). The fourth top-down scene data 110(4) is rotated 90 degrees clockwise relative to the third top-down scene data 110(3), and 270 degrees clockwise (or 90 degrees counterclockwise) relative to the first top-down scene data 110(1). Each instance of top-down scene data 110(1)-110(4) represents the vehicle 102, as well as the objects 112 (e.g., other vehicles and pedestrians) proximate the vehicle 102 in the environment.

The batch of scene data 110(1)-110(4) is input into the machine-learned model 114, and the machine learned model 114 determines the prediction data 116. The prediction data 116 may indicate predicted classifications of the objects 112. For instance, the prediction data 116 indicates that some of the objects 112 are other vehicles 120 and that some of the objects 112 are pedestrians 122. Additionally, the prediction data 116 indicates one or more predicted trajectories 124 associated with the objects 112, as well as relative locations in the environment of the objects 112. The prediction data 116 shown in FIG. 3 is a final prediction that is based on one or more intermediate predictions associated with each of the scene data instances 110(1)-110(4).

Figure 4A:
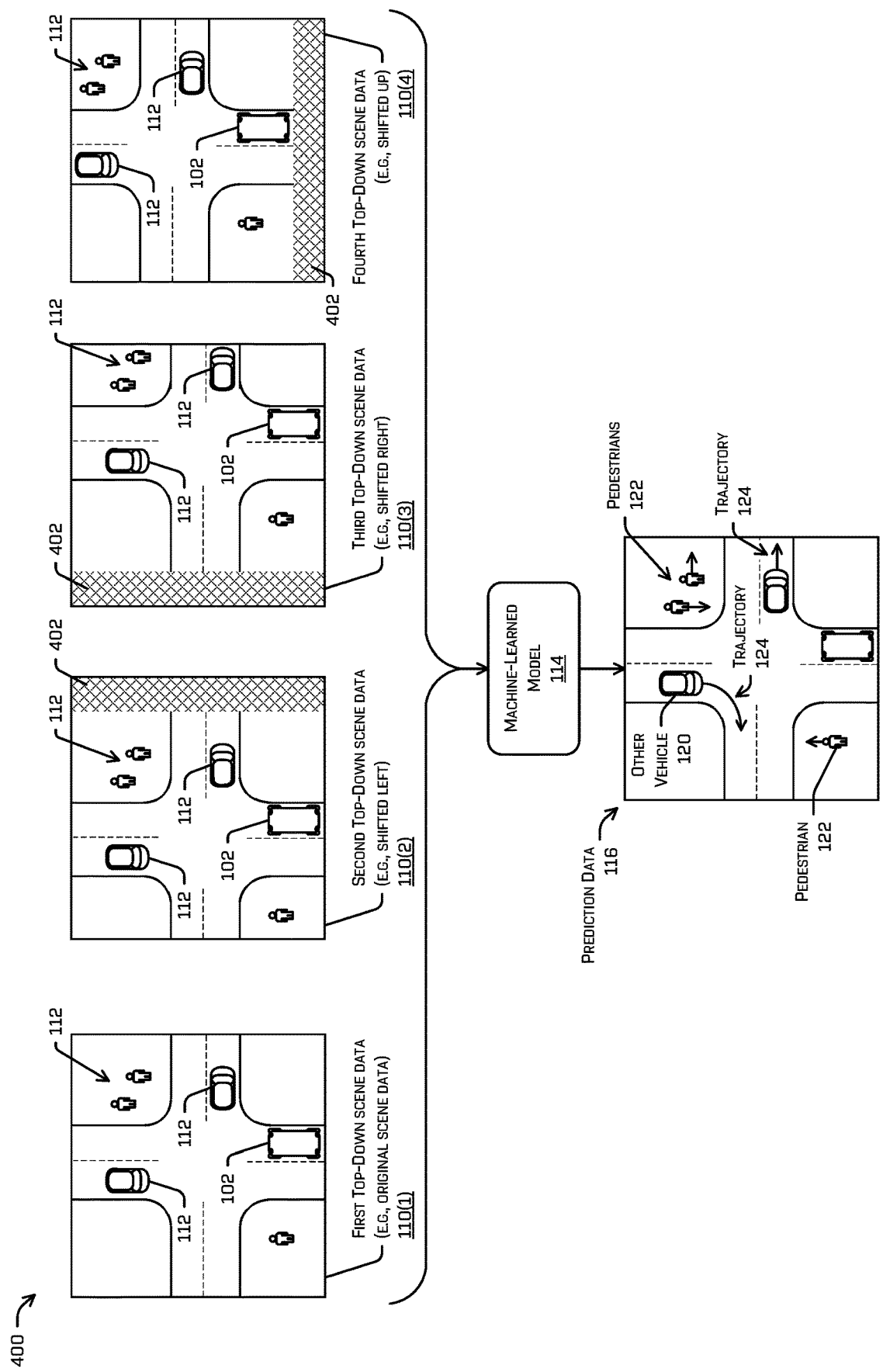
FIG. 4A illustrates another example in which scene data is shifted and the different scene data is input as a batch into a machine-learned model that is configured to determine prediction data.

FIG. 4A illustrates another example 400 in which scene data 110 is shifted and the different scene data 110(1)-110(4) is input as a batch into a machine-learned model 114 that is configured to determine prediction data 116. The scene data 110(1)-110(4) shown in FIG. 4A represents an environment in which the vehicle 102 is operating from a top-down perspective.

The first top-down scene data 110(1) is original scene data. In other words, the first top-down scene data 110(1) has not been rotated, shifted, reflected, or the like. The second top-down scene data 110(2) is shifted left relative to the first top-down scene data 110(1). The third top-down scene data 110(3) is shifted right relative to the first top-down scene data 110(1). The fourth top-down scene data 110(4) is shifted up relative to the first top-down scene data 110(1). Each instance of top-down scene data 110(1)-110(4) represents the vehicle 102, as well as the objects 112 (e.g., other vehicles and pedestrians) proximate the vehicle 102 in the environment. Additionally, in some examples the second, third, and fourth top-down scene data 110(2)-110(4) may include a buffer 402 based on the direction of the shift. The buffer 402 may be a portion of the scene data that is "zero padded," or otherwise modified such that the buffer area 402 does not impact the output of the machine-learned model.

The batch of scene data 110(1)-110(4) is input into the machine-learned model 114, and the machine learned model 114 determines the prediction data 116. The prediction data 116 may indicate classifications of the objects 112. For instance, the prediction data 116 indicates that some of the objects 112 are other vehicles 120 and that some of the objects 112 are pedestrians 122. Additionally, the prediction data 116 indicates one or more predicted trajectories 124 associated with the objects 112, as well as relative locations in the environment of the objects 112. The prediction data 116 shown in FIG. 4A is a final prediction that is based on one or more intermediate predictions associated with each of the scene data instances 110(1)-110(4).

Figure 4B:
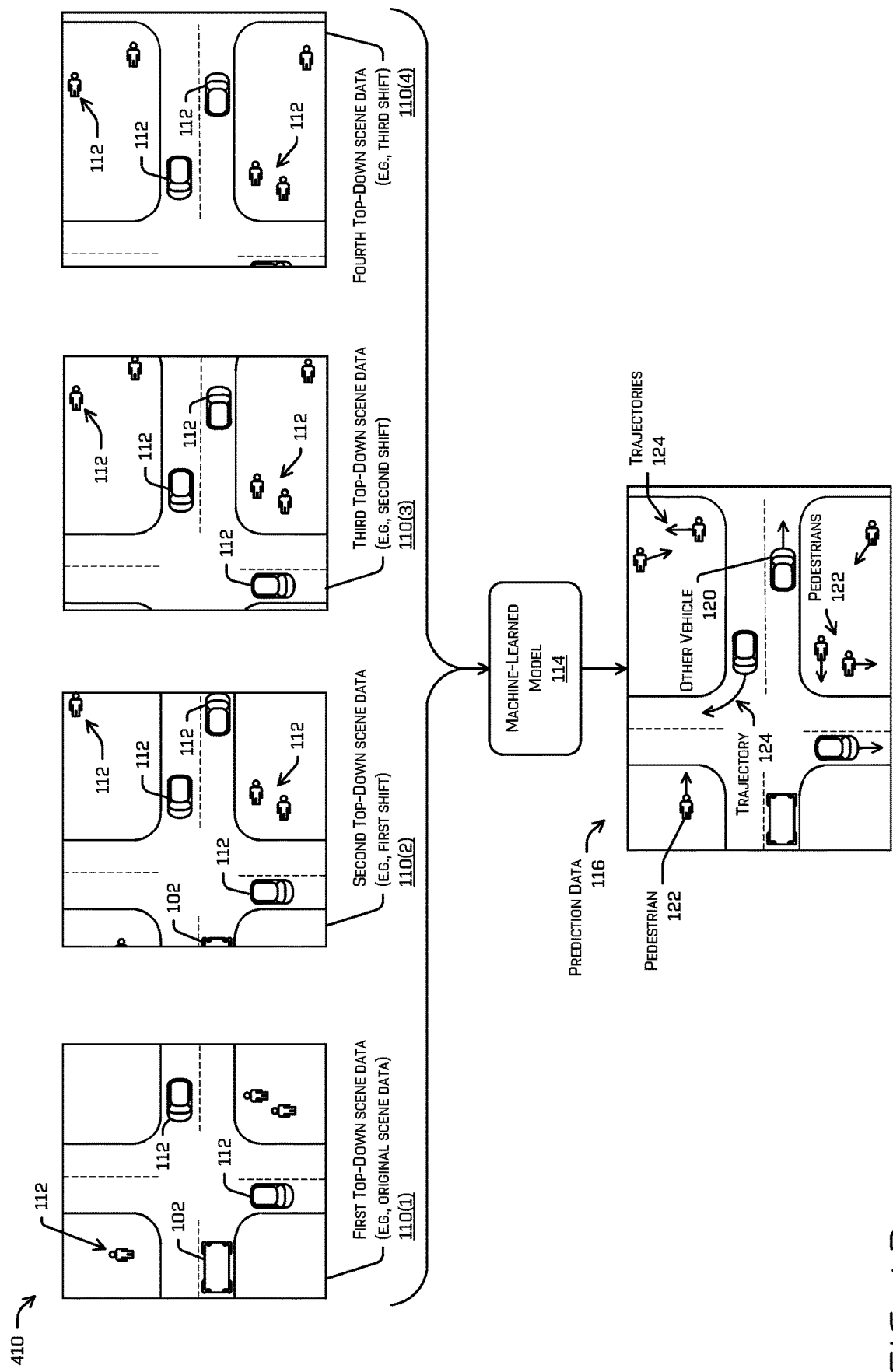
FIG. 4B illustrates an example in which scene data is shifted multiple times before being input as a batch into a machine-learned model such that the prediction data output includes a larger area of the environment.

FIG. 4B illustrates an example 410 in which scene data 110 is shifted multiple times before being input as a batch into a machine-learned model 114 such that the prediction data output 116 includes a larger area of the environment. The scene data 110(1)-110(4) shown in FIG. 4B represents an environment in which the vehicle 102 is operating from a top-down perspective.

The first top-down scene data 110(1) is original scene data. In other words, the first top-down scene data 110(1) has not been rotated, shifted, reflected, or the like. The second top-down scene data 110(2) is shifted by a first amount relative to the first top-down scene data 110(1). The third top-down scene data 110(3) is shifted a second amount relative to the first top-down scene data 110(1). The fourth top-down scene data 110(4) is shifted a third amount relative to the first top-down scene data 110(1). Each instance of top-down scene data 110(1)-110(4) represents the vehicle 102, as well as the objects 112 (e.g., other vehicles and pedestrians) proximate the vehicle 102 in the environment. By shifting each instance of scene data 110 in the same direction and not including a buffer, the area of the environment may be increased. In various examples, the amount and/or direction of shift may be based at least in part on a relative motion of the vehicle 102 and/or the environment or other objects 112. As a non-limiting example, the amount of shift may be based on the relative motion of the vehicle relative to the environment.

The batch of scene data 110(1)-110(4) is input into the machine-learned model 114, and the machine learned model 114 determines the prediction data 116, which includes a larger area of the environment than in the example 400 shown in FIG. 4A. In at least some examples, the shifted data of the scene (e.g., top-down scene data 110(2-4)) may be based at least in part on a prediction of what the scene may look like based on such relative motion (e.g., using prediction, filters, simple temporal integration of present-time states, or other temporal propagation techniques). The prediction data 116 may indicate classifications of the objects 112. For instance, the prediction data 116 indicates that some of the objects 112 are other vehicles 120 and that some of the objects 112 are pedestrians 122. Additionally, the prediction data 116 indicates one or more predicted trajectories 124 associated with the objects 112, as well as relative locations in the environment of the objects 112. The prediction data 116 shown in FIG. 4B is an aggregate prediction that is based on one or more intermediate predictions associated with each of the scene data instances 110(1)-110(4).

Figure 5:
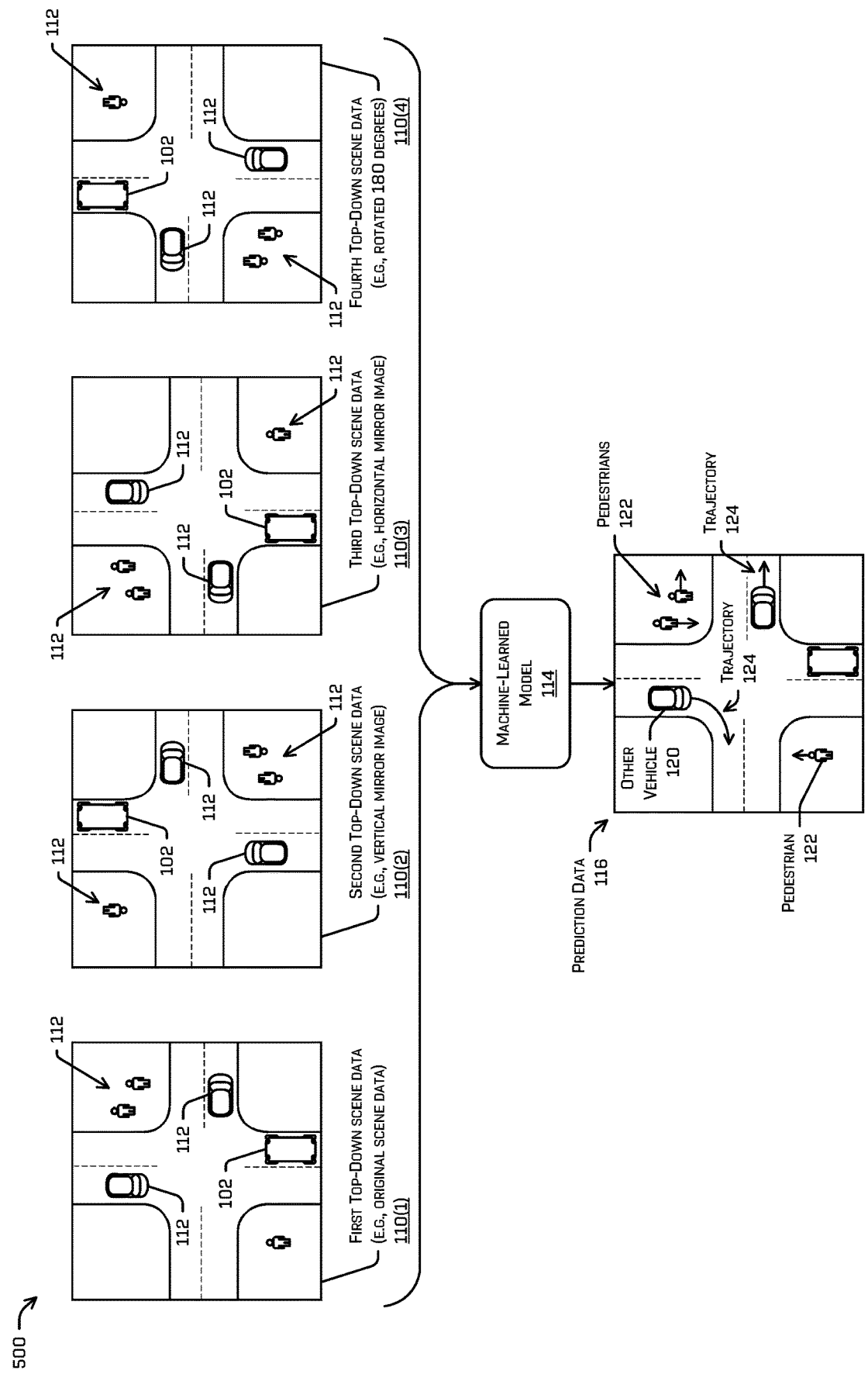
FIG. 5 illustrates yet another example in which scene data is reflected and the different scene data reflections are input as a batch into a machine-learned model that is configured to determine prediction data.

FIG. 5 illustrates yet another example 500 in which scene data 110 is reflected and the different scene data reflections 110(1)-110(4) are input as a batch into a machine-learned model 114 that is configured to determine prediction data 116. The scene data 110(1)-110(4) shown in FIG. 5 represents an environment in which the vehicle 102 is operating from a top-down perspective.

The first top-down scene data 110(1) is original scene data. In other words, the first top-down scene data 110(1) has not been rotated, shifted, reflected, or the like. The second top-down scene data 110(2) is reflected vertically (mirror image about a horizontal axis) relative to the first top-down scene data 110(1). The third top-down scene data 110(3) is reflected horizontally (minor image about a vertical axis) relative to the first top-down scene data 110(1). The fourth top-down scene data 110(4) is rotated 180 degrees relative to the first top-down scene data 110(1) (e.g., reflected horizontally and vertically). Each instance of top-down scene data 110(1)-110(4) represents the vehicle 102, as well as the objects 112 (e.g., other vehicles and pedestrians) proximate the vehicle 102 in the environment.

The batch of scene data 110(1)-110(4) is input into the machine-learned model 114, and the machine learned model 114 determines the prediction data 116. The prediction data 116 may indicate classifications of the objects 112. For instance, the prediction data 116 indicates that some of the objects 112 are other vehicles 120 and that some of the objects 112 are pedestrians 122. Additionally, the prediction data 116 indicates one or more predicted trajectories 124 associated with the objects 112, as well as relative locations in the environment of the objects 112. The prediction data 116 shown in FIG. 5 is a final prediction that is based on one or more intermediate predictions associated with each of the scene data instances 110(1)-110(4).

In the examples 300, 400, and 500 shown in FIGS. 3-5, it should be understood that more orientations are possible in a given batch of scene data 110. For instance, a batch of scene data may include a first scene data instance that is original, a second scene data instance that is rotated relative to the original, a third scene data instance that is shifted relative to the original, a fourth scene data instance that is reflected relative to the original, and the like. Additionally, multiple orientation schemes may be combined with one another. For instance, a scene data instance may be rotated relative to the original and then shifted, or shifted relative to the original and then reflected, and/or the like.

Figure 6:
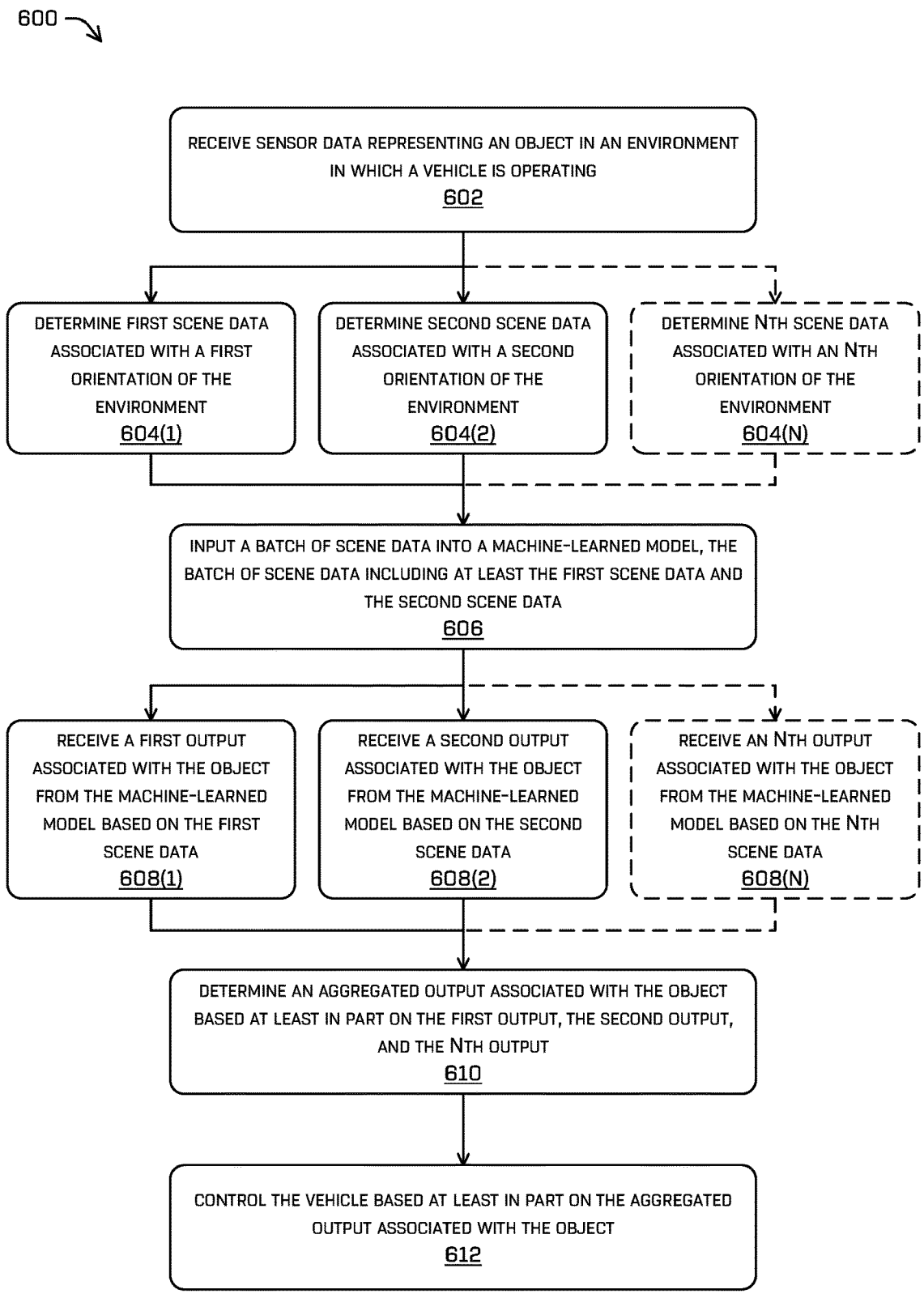
FIG. 6 illustrates an example method for determining different orientations of scene data and inputting the different orientations of the scene data into a machine-learned model.

FIG. 6 illustrates an example method 600 for determining different orientations of scene data and inputting the different orientations of the scene data into a machine-learned model. The operations described herein with respect to the method 600 may be performed by various components and systems, such as the components illustrated in FIGS. 1 and 7.

By way of example, the process 600 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 600. In some examples, multiple branches represent alternate implementations that may be used separately or in combination with other operations discussed herein.

The method 600 begins at operation 602, which includes receiving sensor data representing an object in an environment in which a vehicle is operating. For instance, the computing devices 108 may receive the sensor data 106 representing the object 112. The sensor data may include one or more of image data, lidar data, radar data, GPS data, map data, and the like. In some examples, the sensor data may have been generated by a sensor system of the vehicle 102 while the vehicle 102 was/is operating in the environment 104.

At operations 604(1)-604(N) (where N may be equal to a batch size setting of a machine-learned model), the method 600 includes determining scene data associated with one or more orientations (e.g., translations, rotations, mirrorings, etc.) of the environment. For instance, the one or more computing devices 108 may determine the scene data associated with the one or more orientations of the environment 104. In some examples, the scene data may include first scene data associated with a first orientation of the environment, second scene data associated with a second orientation of the environment, and so forth. In some examples, the first scene data may be associated with a first rotation, first shift, first reflection, and the like, the second scene data may be associated with a second rotation, second shift, second reflection, and the like, and so forth. Operation 604(N) is shown in broken lines because operation 604(N) may be optional, or may include additional, similar operations in parallel with that of operations 604(1)-604(N). In some examples, the first scene data, second scene data, and so forth may be square "images" (e.g., 1000 pixels by 1000 pixels) so that they may be rotated without additional modification to the underlying sensor data used to generate the scene data.

At operation 606, the method 600 includes inputting a batch of scene data into a machine-learned model, the batch of scene data including at least the first scene data and the second scene data. For instance, the computing devices 108 may input the batch of scene data 110 including at least the scene data 110(1) and 110(2) into the machine learned model 114.

At operations 608(1)-608(N) (where N may be equal to the batch size setting of the machine-learned model), the method 600 includes receiving output data associated with the object from the machine-learned model based on the batch of scene data. For instance, the prediction data 116 may be received from the machine learned model 114. The prediction data 116 may include a first output associated with the object based on the first scene data, a second output associated with the object based on the second scene data, and so forth. Operation 608(N) is shown in broken lines because operation 608(N) may be optional, or may include additional, similar operations in parallel with that of operations 608(1)-608(N).

At operation 610, the method 600 includes determining an aggregated output associated with the object based at least in part on the first output, the second output, and the Nth output. For instance, the computing devices 108 may determine the aggregated output associated with the object based at least in part on the different predictions 118(1)-118(N). In some examples, the machine-learned model may be configured to output the aggregated output instead of, or in addition to, the individual outputs corresponding to each scene data input. In some examples, the aggregated output may be based at least in part on an average, a mode, a median, etc. of the predictions 118(1)-118(N). In at least one example, the aggregated output may be based on a majority of the individual outputs (e.g., if three outputs predict an object as a pedestrian, and one output predicts the object as a vehicle, then the object may be classified as a pedestrian). In another example, in the case of predicted trajectories, instead of averaging different trajectories (e.g., a predicted left turn trajectory and a predicted right turn trajectory might be averaged to no turn at all (straight)), the individual trajectories may be added to a group of potential trajectories, and a probability associated with each trajectory may be determined (e.g., the probability that another vehicle turns right, as opposed to not turning at all, or turning left, etc.).

At operation 612, the method 600 includes controlling the vehicle based at least in part on the aggregated output associated with the object. For instance, the aggregated output may be input into a planner component of the vehicle, and the planner component may determine one or more driving instructions for the vehicle based at least in part on the aggregated output. In some examples, controlling the vehicle may include causing the vehicle to traverse the environment according to a specific trajectory.

Figure 7:
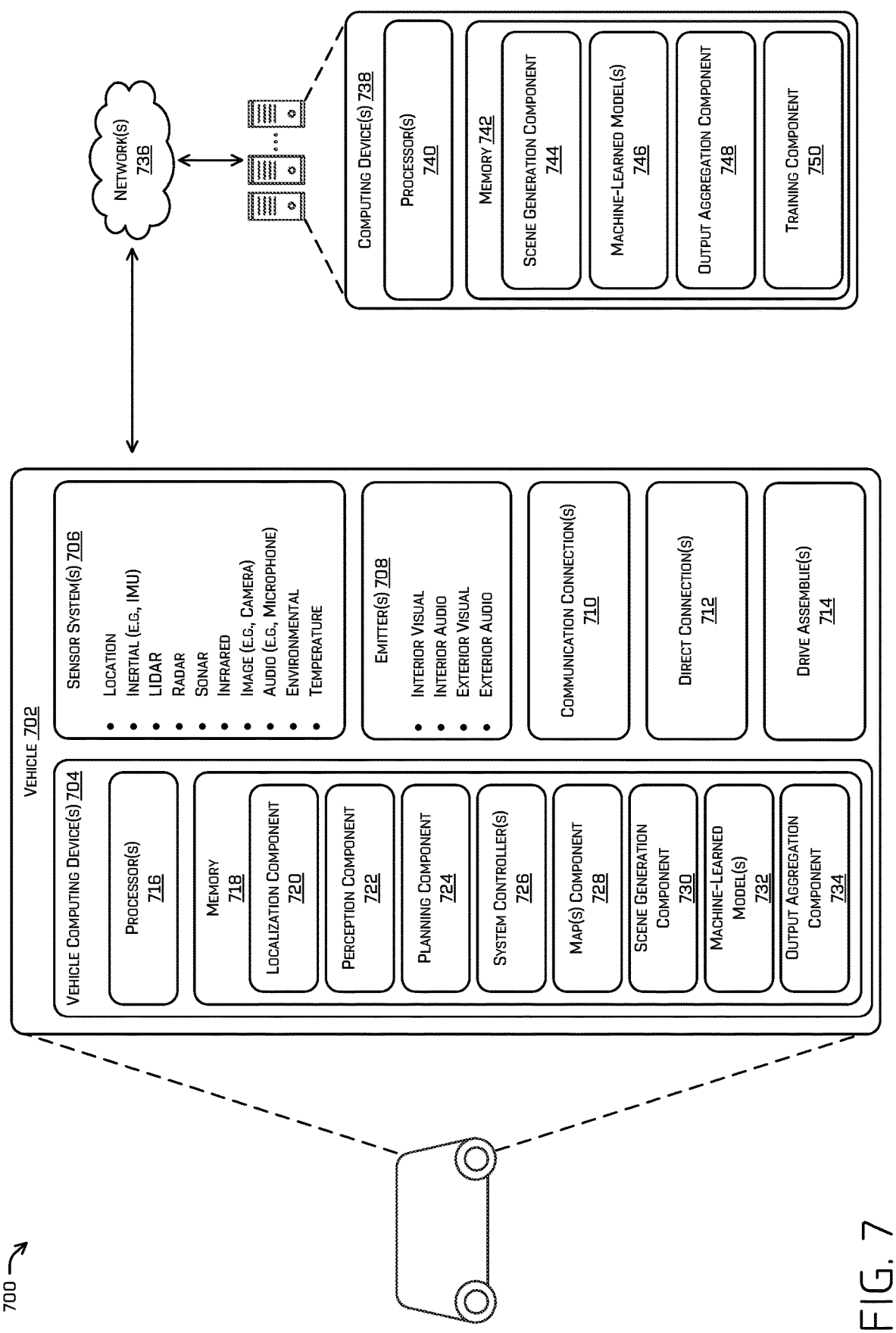
FIG. 7 is an illustration of an example system that may be used to implement some of the techniques described herein.

FIG. 7 depicts a block diagram of an example system 700 that may be used to implement some, or all, of the techniques described herein. In some examples, the system 700 may include one or multiple features, components, and/or functionality of examples described herein with reference to other figures.

The system 700 may include a vehicle 702. In some examples, the vehicle 702 may include some or all of the features, components, and/or functionality described above with respect to the vehicle 102. For instance, the vehicle 702 may comprise a bidirectional vehicle. As shown in FIG. 7, the vehicle 702 may also include a vehicle computing device 704, one or more sensor systems 706, one or more emitters 708, one or more communication connections 710, one or more direct connections 712, and/or one or more drive assemblies 714.

The vehicle computing device 704 can, in some examples, include one or more processors 716 and memory 718 communicatively coupled with the one or more processors 716. In the illustrated example, the vehicle 702 is an autonomous vehicle; however, the vehicle 702 could be any other type of vehicle (e.g., automobile, truck, bus, aircraft, watercraft, train, etc.), or any other system having components such as those illustrated in FIG. 7 (e.g., a robotic system, an automated assembly/manufacturing system, etc.). In examples, the one or more processors 716 may execute instructions stored in the memory 718 to perform one or more operations on behalf of the one or more vehicle computing devices 704.

The memory 718 of the one or more vehicle computing devices 704 can store a localization component 720, a perception component 722, a planning component 724, one or more system controllers 726, a map(s) component 728, a scene generation component 730, one or more machine-learned models 732, and an output aggregation component 734. Though depicted in FIG. 7 as residing in memory 718 for illustrative purposes, it is contemplated that the localization component 720, perception component 722, planning component 724, one or more system controllers 726, map(s) component 728, scene generation component 730, one or more machine-learned models 732, and/or the output aggregation component 734 can additionally, or alternatively, be accessible to the vehicle 702 (e.g., stored on, or otherwise accessible from, memory remote from the vehicle 702, such as memory 742 of one or more computing devices 738).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 706 or received from one or more other devices (e.g., computing devices 738) to accurately determine a location of the autonomous vehicle. In some instances, the localization component 720 can provide data to various components of the vehicle 702 to determine an initial position of the autonomous vehicle for generating a trajectory and/or for determining to retrieve map data.

In some instances, the perception component 722 can include functionality to perform object tracking, detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. For example, the planning component 724 can determine various routes and trajectories and various levels of detail. For example, the planning component 724 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate. In at least one example, the planning component 724 may determine a path for the vehicle 702 to follow to traverse through the environment based at least in part on predictions received from the one or more machine-learned models 732.

In at least one example, the vehicle computing device 704 can include one or more system controllers 726, which can be configured to control steering, propulsion, braking, safety, emitters, communication, components, and other systems of the vehicle 702. These system controller(s) 726 can communicate with and/or control corresponding systems of the drive assembly(s) 714 and/or other components of the vehicle 702.

The memory 718 can further include the map(s) component 728 to maintain and/or update one or more maps (not shown) that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 702 can be controlled based at least in part on the maps. That is, the maps can be used in connection with the localization component 720, the perception component 722, and/or the planning component 724 to determine a location of the vehicle 702, identify objects in an environment, and/or generate routes and/or trajectories to navigate within an environment. Additionally, the maps can be used in connection with the web-based application to generate content associated with the vehicle 702, such as a data visualization.

In some examples, the one or more maps can be stored on a remote computing device(s) (such as the computing device(s) 738) accessible via one or more network(s) 736. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 718 may also store a scene generation component 730. The scene generation component 730 may include functionality to perform the techniques described herein for generating scene data representing an environment based on sensor data, as well as rotating, shifting, reflecting, and/or translating scene data to include different orientations. The scene generation component 730 may receive sensor data from the sensor systems 706, as well as the maps component 728, localization component 720, and/or the perception component 722 to generate scene data representing an environment in which the vehicle 702 is operating from a top-down perspective.

The memory 718 can further include one or more machine-learned models 732. The one or more machine-learned models may include at least the machine-learned model 114 described above, which is configured to determine predictions associated with objects within the environment of the vehicle 702 based on scene data inputs.

As shown, the memory 718 may also store an output aggregation component 734. The output aggregation component 734 may combine and/or determine a median, mean, and/or mode associated with predictions output by the machine-learned models 732. For instance, the machine-learned models 732 may output predictions corresponding to each input scene of a batch of scene data, and the output aggregation component 734 may aggregate the different predictions to determine a final prediction. The output aggregation component 734 may additionally drop low confidence outputs so that the low confidence outputs do not negatively affect the aggregated output. Additionally, the output aggregation component 734 may determine aggregated outputs based on a majority of outputs. For instance, if a majority of outputs indicate that an object is a pedestrian as opposed to something else (e.g., vehicle, structure, etc.), then the aggregation component 734 may determine that the object is the pedestrian.

In some instances, aspects of some or all of the memory-stored components discussed herein can include any models, algorithms, and/or machine learning algorithms. For example, in some instances, components in the memory 718 (and the memory 742, discussed in further detail below) such as the localization component 720, the perception component 722, and/or the planning component 724 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 706 can include multiple instances of each of these or other types of sensors. For instance, the lidar sensors can include individual lidar sensors located at the corners, front, back, sides, and/or top of the vehicle 702. As another example, the image sensors can include multiple image sensors disposed at various locations about the exterior and/or interior of the vehicle 702. As an even further example, the inertial sensors can include multiple IMUs coupled to the vehicle 702 at various locations. The sensor system(s) 706 can provide input to the vehicle computing device 704. Additionally, or alternatively, the sensor system(s) 706 can send sensor data, via the one or more networks 736, to the one or more computing device(s) 738 at a particular frequency, after a lapse of a predetermined period of time, in near real-time, etc.

The vehicle 702 can also include one or more emitters 708 for emitting light and/or sound. The emitters 708 in this example include interior audio and visual emitters to communicate with passengers of the vehicle 702. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive assembly(s) 714. Also, the communication connection(s) 710 can allow the vehicle 702 to communicate with other nearby computing device(s) (e.g., other nearby vehicles, traffic signals, laptop computer 146, etc.). The communications connection(s) 710 also enable the vehicle 702 to communicate with a remote teleoperations system or other remote services.

The communications connection(s) 710 can include physical and/or logical interfaces for connecting the vehicle computing device(s) 704 to another computing device (e.g., computing device(s) 738) and/or a network, such as network(s) 736. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 712 of vehicle 702 can provide a physical interface to couple the one or more drive assembly(s) 714 with the body of the vehicle 702. For example, the direct connection 712 can allow the transfer of energy, fluids, air, data, etc. between the drive assembly(s) 714 and the vehicle 702. In some instances, the direct connection 712 can further releasably secure the drive assembly(s) 714 to the body of the vehicle 702.

In at least one example, the vehicle 702 can include one or more drive assemblies 714. In some examples, the vehicle 702 can have a single drive assembly 714. In at least one example, if the vehicle 702 has multiple drive assemblies 714, individual drive assemblies 714 can be positioned on opposite longitudinal ends of the vehicle 702 (e.g., the leading and trailing ends, the front and the rear, etc.). In at least one example, a single drive assembly 714 of the vehicle 702 may include one or more IMU sensors.

The drive assembly(s) 714 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 714 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 714. Furthermore, the drive assembly(s) 714 may also include one or more communication connection(s) that enable communication by the respective drive assembly with one or more other local or remote computing device(s).

The computing device(s) 738 can include one or more processors 740 and memory 742 that may be communicatively coupled to the one or more processors 740. The memory 742 may store a scene generation component 744, one or more machine-learned models 746, an output aggregation component 748, and a training component 750. In some examples, the computing device(s) 738 may be associated with a teleoperations system that remotely monitors a fleet of vehicles. Additionally, or alternatively, the computing devices(s) 738 may be leveraged by the teleoperations system to receive and/or process data on behalf of the teleoperations system.

The memory 742 may also store a scene generation component 744, which may be similar to the scene generation component 730. The scene generation component 744 may include functionality to perform the techniques described herein for generating scene data representing an environment based on sensor data, as well as rotating, shifting, reflecting, and/or translating scene data to include different orientations. The scene generation component 744 may receive sensor data from the sensor systems 706, as well as the maps component 728, localization component 720, and/or the perception component 722 to generate scene data representing an environment in which the vehicle 702 is operating from a top-down perspective. In some examples, the scene generation component 744 may receive sensor data and rotate, translate, mirror, etc. the sensor data in order to generate the scene data according to the various rotations, translations, reflections, etc. Additionally, or alternatively, the scene generation component 744 may generate scene data, and then rotate, shift, reflect, etc. the scene data itself, instead of the underlying sensor data.

The memory 742 can further include one or more machine-learned models 746. The one or more machine-learned models may include at least the machine-learned model 114 described above, which is configured to determine predictions associated with objects within the environment of the vehicle 702 based on scene data inputs.

As shown, the memory 742 may also store an output aggregation component 748. The output aggregation component 748 may combine and/or determine a median, mean, and/or mode associated with predictions output by the machine-learned models 746. For instance, the machine-learned models 746 may output predictions corresponding to each input scene of a batch of scene data, and the output aggregation component 748 may aggregate the different predictions to determine a final prediction.

The memory 742 may also store a training component 750. The training component 750 may train machine-learned models 732 and/or 746 to make predictions associated with objects in an environment in which the vehicle 702 is operating based on input scene data from the scene generation components 730 and/or 744. In various examples, the training component 750 may train the machine-learned models using varying batch sizes of inputs (e.g., batch sizes of 2, 3, 4, etc.) in which the different inputs are associated with different rotations, translations, reflections, and the like. By training machine-learned models in this way, the rotational invariance of a model may be improved.

The processor(s) 716 of the vehicle 702 and the processor(s) 740 of the computing device(s) 738 can be any suitable processor capable of executing instructions to process data and perform operations as described herein. By way of example and not limitation, the processor(s) 716 and 740 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 742 are examples of non-transitory computer-readable media. The memory 718 and 742 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 7 is illustrated as a distributed system, in alternative examples, components of the vehicle 702 can be associated with the computing device(s) 738 and/or components of the computing device(s) 738 can be associated with the vehicle 702. That is, the vehicle 702 can perform one or more of the functions associated with the computing device(s) 738, and vice versa.

EXAMPLE CLAUSES

A. A system comprising: one or more processors; and one or more non-transitory computer-readable media storing instructions that, when executed by the one or more processors, cause the system to perform operations comprising: receiving sensor data from a sensor associated with a vehicle in an environment, the sensor data representing an object in the environment; determining, based at least in part on the sensor data, first top-down data representing the environment, wherein the first top-down data is associated with a first rotation; determining, based at least in part on the sensor data, second top-down data representing the environment, wherein the second top-down data is associated with a second rotation that is different than the first rotation; inputting the first top-down data and the second top-down data into a machine learned model; receiving, from the machine-learned model and based on the first top-down data, a first output associated with the object; receiving, from the machine-learned model and based on the second top-down data, a second output associated with the object; determining, based at least in part on the first output and the second output, an aggregate output; and controlling a trajectory of the vehicle based at least in part on the aggregate output.

B. The system as recited in paragraph A, wherein determining the aggregate output comprises determining, as the aggregate output, an average of a first feature vector indicated in the first output and a second feature vector indicated in the second output.

C. The system as recited in any one of paragraphs A-B, wherein the first output, the second output, and the aggregate output comprise at least one of a classification of the object, a location of the object, a bounding box containing the object, or a predicted trajectory of the object.

D. The system as recited in any one of paragraphs A-C, wherein inputting the first top-down data and the second top down data into the machine-learned model comprises inputting a batch of top-down data into the machine-learned model, the batch of top-down data comprising: the first-top down data; the second top-down data; third-top down data associated with a third rotation; and fourth top-down data associated with a fourth rotation, wherein the second rotation is rotated 90 degrees with respect to the first rotation, the third rotation is rotated 90 degrees with respect to the second rotation, and the fourth rotation is rotated 90 degrees with respect to the third rotation.

E. A method comprising: receiving sensor data associated with a vehicle in an environment; determining first scene data based at least in part on the sensor data; determining second scene data based at least in part on applying a transformation to the sensor data; inputting the first scene data and the second scene data into a machine learned model; receiving a first output from the machine-learned model based on the first scene data; receiving a second output from the machine-learned model based on the second scene data; and controlling the vehicle based at least in part on the first output and the second output.

F. The method as recited in paragraph E, further comprising determining a third output based at least in part on an aggregation of the first output and the second output, wherein controlling the vehicle is based at least in part on the third output.

G. The method as recited in any one of paragraphs E-F, wherein the aggregation is an average of a first feature vector indicated by the first output and a second feature vector indicated by the second output.

H. The method as recited in any one of paragraphs E-G, wherein the transformation comprises one or more of: a rotation, a translation, or a mirroring.

I. The method as recited in any one of paragraphs E-H, wherein the transformation comprises the rotation such that the second scene data is rotated relative to the first scene data.

J. The method as recited in any one of paragraphs E-I, wherein the second scene data is rotated substantially perpendicular relative to the first scene data.

K. The method as recited in any one of paragraphs E-J, wherein the transformation comprises the translation, the method further comprising padding the second scene data based at least in part on the translation such that a size of the second scene data is equivalent to a size of the first scene data.

L. The method as recited in any one of paragraphs E-K, wherein the sensor data is one or more of image data, lidar data, radar data, or geolocation data.

M. The method as recited in any one of paragraphs E-L, further comprising: determining, based at least in part on the first scene data and a second transformation, third scene data; determining, based at least in part on the first scene data and a third transformation, fourth scene data; and wherein inputting the first scene data and the second scene data into the machine learned model comprises inputting a batch of scene data into the machine-learned model, the batch of scene data including the first scene data, the second scene data, the third scene data, and the fourth scene data.

N. The method as recited in any one of paragraphs E-M, wherein: the second orientation of the environment is rotated a threshold amount relative to the first orientation of the environment, the third orientation of the environment is rotated the threshold amount relative to the second orientation of the environment, and the fourth orientation of the environment is rotated the threshold amount relative to the third orientation of the environment.

O. The method as recited in any one of paragraphs E-N, wherein the first scene data is a first multi-channel image representing the environment from a top-down perspective and the second scene data is a second multi-channel image representing the environment from the top-down perspective.

P. One or more non-transitory computer-readable media storing instructions that, when executed by one or more processors, cause the one or more processors to perform operations comprising: receiving sensor data associated with a vehicle in an environment; determining first scene data based at least in part on the sensor data; determining second scene data based at least in part on applying a transformation to the sensor data; inputting the first scene data and the second scene data into a machine-learned model; receiving a first output from the machine-learned model based on the first scene data; receiving a second output from the machine-learned model based on the second scene data; and controlling the vehicle based at least in part on the first output and the second output.

Q. The one or more non-transitory computer-readable media as recited in paragraph P, the operations further comprising determining a third output based at least in part on an aggregation of the first output and the second output, wherein controlling the vehicle is based at least in part on the third prediction.

R. The one or more non-transitory computer-readable media as recited in any one of paragraphs P-Q, wherein the transformation comprises one or more of: a rotation, a translation, or a mirroring.

S. The one or more non-transitory computer-readable media as recited in any one of paragraphs P-R, wherein the transformation comprises the rotation such that the second scene data is rotated relative to the first scene data.

T. The one or more non-transitory computer-readable media as recited in any one of paragraphs P-S, further comprising: determining third scene data based at least in part on applying a second transformation to the sensor data; determining fourth scene data based at least in part on applying a third transformation to the sensor data; and wherein inputting the first scene data and the second scene data into the machine-learned model comprises inputting a batch of scene data into the machine-learned model, the batch of scene data including the first scene data, the second scene data, the third scene data, and the fourth scene data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions that, when executed by the one or more processors, cause the system to perform operations comprising:
   receiving sensor data from a sensor associated with a vehicle in an environment, the sensor data representing an object in the environment;
   determining, based at least in part on the sensor data, first top-down data representing the environment, wherein the first top-down data is associated with a first rotation;
   determining, based at least in part on the sensor data, second top-down data representing the environment, wherein the second top-down data is associated with a second rotation that is different than the first rotation;
   inputting the first top-down data and the second top-down data into a machine-learned model;
   receiving, from the machine-learned model and based on the first top-down data, a first output associated with the object;
   receiving, from the machine-learned model and based on the second top-down data, a second output associated with the object;
   determining, based at least in part on the first output and the second output, an aggregate output; and
   controlling a trajectory of the vehicle based at least in part on the aggregate output.

2. The system of claim 1, wherein determining the aggregate output comprises determining, as the aggregate output, an average of a first feature vector indicated in the first output and a second feature vector indicated in the second output.

3. The system of claim 1, wherein the first output, the second output, and the aggregate output comprise at least one of a classification of the object, a location of the object, a bounding box containing the object, or a predicted trajectory of the object.

4. The system of claim 1, wherein inputting the first top-down data and the second top-down data into the machine-learned model comprises inputting a batch of top-down data into the machine-learned model, the batch of top-down data comprising:
the first top-down data;
the second top-down data;
third-top down data associated with a third rotation; and
fourth top-down data associated with a fourth rotation,
wherein the second rotation is rotated 90 degrees with respect to the first rotation, the third rotation is rotated 90 degrees with respect to the second rotation, and the fourth rotation is rotated 90 degrees with respect to the third rotation.

5. A method comprising:
receiving sensor data associated with a vehicle in an environment;
determining first scene data based at least in part on the sensor data;
determining second scene data based at least in part on applying a transformation to the sensor data to rotate the second scene data relative to the first scene data;
inputting the first scene data and the second scene data into a machine-learned model;
receiving a first output from the machine-learned model based on the first scene data;
receiving a second output from the machine-learned model based on the second scene data; and
controlling the vehicle based at least in part on the first output and the second output.

6. The method of claim 5, further comprising determining a third output based at least in part on an aggregation of the first output and the second output, wherein controlling the vehicle is based at least in part on the third output.

7. The method of claim 6, wherein the aggregation is an average of a first feature vector indicated by the first output and a second feature vector indicated by the second output.

8. The method of claim 5, wherein the transformation comprises one or more of:
a rotation,
a translation, or
a mirroring.

9. The method of claim 5, wherein the second scene data is rotated substantially perpendicular relative to the first scene data.

10. The method of claim 8, wherein the transformation comprises the translation, the method further comprising padding the second scene data based at least in part on the translation such that a size of the second scene data is equivalent to a size of the first scene data.

11. The method of claim 5, wherein the sensor data is one or more of image data, lidar data, radar data, or geolocation data.

12. The method of claim 5, further comprising:
determining, based at least in part on the first scene data and a second transformation, third scene data; and
determining, based at least in part on the first scene data and a third transformation, fourth scene data;
wherein inputting the first scene data and the second scene data into the machine-learned model comprises inputting a batch of scene data into the machine-learned model, the batch of scene data including the first scene data, the second scene data, the third scene data, and the fourth scene data.

13. The method of claim 12, wherein:
the first scene data is associated with a first orientation of the environment and the second scene data is associated with a second orientation of the environment that is rotated a threshold amount relative to the first orientation of the environment,
the third scene data is associated with a third orientation of the environment that is rotated the threshold amount relative to the second orientation of the environment, and
the fourth scene data is associated with a fourth orientation of the environment that is rotated the threshold amount relative to the third orientation of the environment.

14. The method of claim 5, wherein the first scene data is a first multi-channel image representing the environment from a top-down perspective and the second scene data is a second multi-channel image representing the environment from the top-down perspective.

15. One or more non-transitory computer-readable media storing instructions that, when executed by one or more processors, cause the one or more processors to perform operations comprising:
receiving sensor data associated with a vehicle in an environment;
determining first scene data based at least in part on the sensor data;
determining second scene data based at least in part on applying a transformation to the sensor data to rotate the second scene data relative to the first scene data;
inputting the first scene data and the second scene data into a machine-learned model;
receiving a first output from the machine-learned model based on the first scene data;
receiving a second output from the machine-learned model based on the second scene data; and
controlling the vehicle based at least in part on the first output and the second output.

16. The one or more non-transitory computer-readable media of claim 15, the operations further comprising determining a third output based at least in part on an aggregation of the first output and the second output, wherein controlling the vehicle is based at least in part on the third output.

17. The one or more non-transitory computer-readable media of claim 15, wherein the transformation comprises one or more of:
a rotation,
a translation, or
a mirroring.

18. The one or more non-transitory computer-readable media of claim 15, further comprising:
determining third scene data based at least in part on applying a second transformation to the sensor data; and
determining fourth scene data based at least in part on applying a third transformation to the sensor data;
wherein inputting the first scene data and the second scene data into the machine-learned model comprises inputting a batch of scene data into the machine-learned model, the batch of scene data including the first scene data, the second scene data, the third scene data, and the fourth scene data.

19. The method of claim 5, wherein the second scene data is determined based at least in part on applying the transformation to the first scene data.

20. The one or more non-transitory computer-readable media of claim 15, wherein the second scene data is determined based at least in part on applying the transformation to the first scene data.

* * * * *